Patented Dec. 24, 1940

2,226,062

UNITED STATES PATENT OFFICE 2,226,062

N:N'-DIALKYL-2:2'-DIPYRAZOLANTHRONYLS

Jacob Koch, Basel, and Max Bommer, Riehen, near Basel, Switzerland, assignors to the Society of Chemical Industry in Basle, Basel, Switzerland No Drawing. Application July 26, 1937, Serial No. 155,822. In Switzerland July 30, 1936

11 Claims. (Cl. 260—312)

This invention relates to the manufacture of new N:N'-dialkyl-dipyrazolanthronyls by treating a pyrazolanthrone or a dipyrazolanthronyl with an alkylating agent of which the alkyl residue is branched and contains no alkoxy-group; if desired, the product obtained may be treated with a condensing agent or a substituting agent or both.

Pyrazolanthrones or dipyrazolanthronyls which are suitable as parent materials for this invention are, for instance, the simplest pyrazolanthrone, the 2-halogen-pyrazolanthrones, the 2:2'-dipyrazolanthronyl, as well as the dipyrazolanthronyls in which the hydrogen atom of the imino-group of the one pyrazole nucleus has been exchanged for an alkyl-group, for instance methyl- or ethyl- or benzyl-group or an alkoxyalkyl-group, such as methoxyethyl-, ethoxyethyl- or butoxyethyl-group. To these dipyrazolanthronyls belong, for instance, the N-monomethyl- or N-monoethyl-2:2'-dipyrazolanthronyl or the N-monomethoxymethyl- or N-monoethoxyethyl-2:2'-dipyrazolanthronyl. All these parent materials may contain substituents in the anthrone nucleus or in the anthrone nuclei, for instance halogens.

The introduction of at least one branched alkyl group containing no alkoxy-group, as for example an isopropyl group, an isobutyl group, an isoamyl group, a β-hydroxy-isopropyl group or a β-phenyl-isopropyl group, into the pyrazolanthrones or dipyrazolanthronyls is effected according to known methods.

Alkylating agents suitable for use in the invention are iso-alcohols, for example isobutylalcohol, isopropyl alcohol and isoamylalcohol, as well as esters of these, for instance the hydrogenhalide esters, the sulfuric acid esters, and especially the arylsulfonic acid esters. The following are examples of such esters: the isopropyl chloride, the several isobutyl and isoamyl halides, the para-toluenesulfonic acid ester of isopropylalcohol or of isobutylalcohol or of isoamylalcohol. Further alkylating agents are, for example esters of polyhydric isoalcohols which contain a free hydroxyl group, for instance the para-toluenesulfonic acid ester of α:α'-dichlorhydrine.

The treatment with the alkylating agent may be conducted at high temperature, for example between 120 and 200° C. A solvent or diluent may be present, for instance nitrobenzene, chlorobenzene, trichlorobenzene, amylalcohol, naphthalene or anisole, and the operation may be performed in an open vessel or under pressure. When an isoalcohol which still has a free hydroxyl group is used as the alkylating agent, it is preferable to alkylate in the presence of an acid, for instance sulfuric acid; when an ester is used which contains no free hydroxy-group, it is preferable to use the alkali salt, for instance the sodium or potassium salt of the pyrazolanthrone or dipyrazolanthronyl.

When pyrazolanthrones are used, which are not substituted in 2-position or contain in 2-position for instance halogen, the N-isoalkyl-pyrazolanthrone obtained by introducing the isoalkyl-group may, if desired after separation of any accompanying isomeric alkylation products, be converted by the action of a condensing agent or a substituting agent, for instance caustic alkali or copper, or by reduction and subsequent oxidation into the corresponding N:N'-di-isoalkyl-2:2'-dipyrazolanthronyl.

The invention permits the production of dipyrazolanthronyls, substituted at the imino-groups by alkyl-groups differing from each other; for example when the dipyrazolanthronyl is treated in a first stage, for instance, with para-toluenesulfonic acid ester of isopropyl alcohol and in a second stage with the para-toluenesulfonic acid ester of an isobutyl alcohol, or when the dipyrazolanthronyl is treated with a mixture of alkylating agents containing isoalkyl groups; moreover, such products may also be obtained by the action of para-toluene-sulfonic acid isopropylester, for example on N-monomethyl- or N-monomethoxyethyl-2:2'-dipyrazolanthronyl or by treatment of the N-monoisoalkyl-2:2'-dipyrazolanthronyl with a substituting agent, for example methylhalide, ethylhalide or β-halogen-ethylmethylether.

Particularly valuable are those N:N'-dialkyl-2:2'-dipyrazolanthronyls obtainable according to the present invention in which the alkyl groups contain not more than 5 carbon atoms.

The dipyrazolanthronyls obtainable by the invention containing at least 1 isoalkyl-group may be treated with condensing and/or substituting agents, for example sulfuric acid, aldehydes, for instance formaldehyde, or halogenating agents whereby further valuable products are obtained.

The new N:N'-dialkyl-dipyrazolanthronyls may be purified by cyrstallisation or by conversion into their salts with strong acids or by treatment with oxidising agents, for instance alkalihypochloride solution; for they may be converted into their leuco-derivatives, for instance leucosulfuric acid esters, by known methods.

The products of the invention serve in part as new intermediate products and in part as dyestuffs.

Those products in which the isoalkyl-groups correspond with residues of secondary alcohols are of special value.

The new dyestuffs are used, if desired in admixture with N:N'-dimethyl- or di-ethyl-2:2'-dipyrazolanthronyl or with N:N'-dimethoxyethyl- or diethoxyethyl-2:2'-dipyrazolanthronyls, for dyeing or printing vegetable fibres, for instance cotton, or for colouring lacquers and plastic masses or dyeing artificial silk, for instance acetate artificial silk. The dyeings and printings obtained, especially those which are red, are very fast and in many cases are changed only very slightly in tint by development of the direct dyeing.

The following examples illustrate the invention, the parts being by weight:

Example 1

11 parts of finely pulverized dry dipotassium salt of 2:2'-dipyrazolanthronyl and 4 parts of anhydrous potassium carbonate are suspended in 100 parts of nitrobenzene; 17 parts of para-toluenesulfonic acid isopropyl ester are added. The mixture is heated while stirring. At about 140° C. reaction begins and the colour of the mixture changes from brown to red. After stirring for about 16 hours at 150–160° C. the mass is allowed to cool. The dyestuff formed is filtered with suction and extracted alternately with boiling alcohol and boiling water until the filtrates are practically colourless.

The dyestuff of the formula

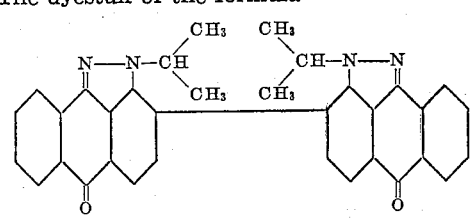

is a bluish-red powder soluble in concentrated sulfuric acid to an orange solution. In a greenish-blue vat it dyes cotton remarkably pure strong red tints of characteristic properties of fastness. The dyeings remain practically unchanged when soaped.

If instead of isopropyl-para-toluenesulfonic acid ester there is used the para-toluenesulfonic acid ester of secondary butylalcohol, a dyestuff of similar properties is obtained.

Instead of nitrobenzene, ortho-dichlorobenzene or trichlorobenzene may be used as the diluent.

Example 2

11 parts of dry dipotassium salt of 2:2'-dipyrazolanthronyl and 4 parts of anhydrous potassium carbonate are suspended in 120 parts of trichlorobenzene, 4.5 parts of para-toluenesulfonic acid ethyl ester are added and the whole is stirred for about 7 hours at 160° C. After cooling to about 80° C. 7 parts of para-toluenesulfonic acid isopropylester are added and heating is continued for 12 hours at 160° C. The product is worked up as described in Example 1. The dyestuff of the formula

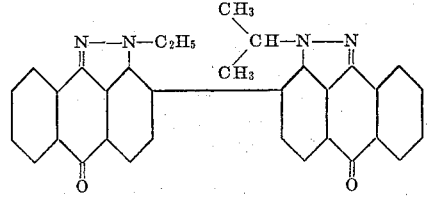

dissolves in concentrated sulfuric acid to an orange solution and also yields a greenish-blue vat. The red dyeings on cotton are of characteristic fastness and are changed only very slightly by soaping.

The same dyestuff may be produced by reversing the order of alkylation, that is to say by using the para-toluenesulfonic acid isopropylester first and then the para-toluenesulfonic acid ethylester; a product of similar dyeing properties is obtained if both the alkylating agents are present from the beginning.

If instead of toluenesulfonic acid ethylester, the corresponding methylester and/or instead of the para-toluenesulfonic acid isopropylester, the para-toluenesulfonic acid ester of secondary butylalcohol is used, similar dyestuffs are obtained.

Example 3

11 parts of dry finely powdered dipotassium salt of 2:2'-dipyrazolanthronyl and 4 parts of anhydrous potassium carbonate are suspended in 120 parts of chlorobenzene. 4.8 parts of para-toluene sulfonic acid methoxyethylester are added and the whole is stirred for about 7 hours at 160° C. After cooling to about 80° C., 6.5 parts of para-toluenesulfonic acid isopropylester are added and heating is continued for 12 hours at 160° C. The product is worked up as described in Example 1. The dyestuff of the formula

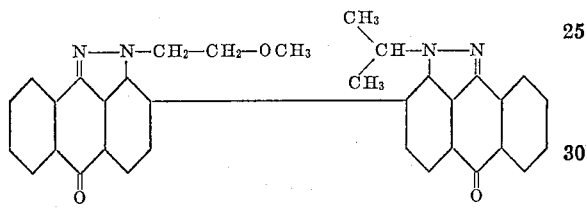

dissolves in concentrated sulfuric acid to an orange solution and yields a greenish-blue vat. The red dyeings on cotton are of characteristic fastness and are practically unchanged when soaped.

The same dyestuff is obtained when the order of alkylation is reversed, that is to say by using the para-toluenesulfonic acid isopropylester first and then the para-toluenesulfonic acid methoxyethylester, a dyestuff of similar dyeing properties is obtained when both alkylating agents are present from the beginning or when alkylation is first with β-bromethylmethylether and then with para-toluenesulfonic acid isopropylester.

If instead of para-toluenesulfonic acid methoxyethylester, the corresponding ethoxyethylester is used and/or instead of the para-toluenesulfonic acid isopropylester, the para-toluenesulfonic acid ester of secondary butylalcohol similar dyestuffs are obtained.

Example 4

33 parts of dry finely divided dipotassium salt of 2:2'-dipyrazolanthronyl and 6 parts of anhydrous potassium carbonate are suspended in 350 parts of trichlorobenzene, 14 parts of para-toluenesulfonic acid isopropylester are added, and the whole is stirred for about 10 hours at 160° C. After cooling, the mono-(N)-isopropyl-2:2'-dipyrazolanthronyl which has been formed is filtered with suction and purified by extraction with boiling water and boiling alcohol.

15 parts of the product thus obtained are converted into the potassium salt.

11 parts of the potassium salt are mixed with 0.5 part of copper acetate and 55 parts of ethylbromide and the mixture is heated in an autoclave for 4 hours at 160° C. After cooling, the dyestuff thus produced is purified by extraction with boiling water and boiling alcohol.

The dyestuff is identical with that described in Example 2.

Example 5

11 parts of N:N'-di-isopropyl-2:2'-dipyrazolanthronyl are dissolved in 100 parts fuming sulfuric acid of 20 per cent. strength. 0.1 part of iodine is added and at a temperature of about 50° C. 7 parts of bromine are introduced by drops in the course of about 1 hour. After stirring for 2 hours at 50-60° C., the mass is poured into ice. The dyestuff thus precipitated of the formula

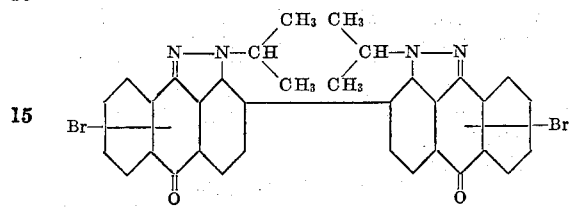

is filtered with suction, washed to neutral and dried. It is a green-bronze powder soluble in concentrated sulfuric acid to an orange solution. It dyes cotton in a blue vat bluish-red tints practically unchanged when soaped.

The same dyestuff is obtained when 2:2'-dipyrazolanthronyl is dibrominated and the isopropyl residue introduced into the imino-groups of the bromination product.

If in the above example instead of N:N'-di-isopropyl-2:2'-dipyrazolanthronyl, there is used another N:N'-diisoalkyl-2:2'-dipyrazolanthronyl, a similar dyestuff is obtained.

Example 6

Into a mixture of 50 parts of caustic potash and 40 parts of ethylalcohol heated to 110° C., 10 parts of N-isopropyl-pyrazolanthrone are introduced. The temperature is maintained at 110-115° C. for an hour and then the mixture is poured into about 1000 parts of water and the dyestuff is oxidised by introduction of air at room temperature. After filtration with suction, the solid matter is freed from impurities by extraction with alcohol. The purified dyestuff is identical with that obtained in Example 1.

The N-isopropyl-pyrazolanthrone used in this example may be made by heating for several hours a mixture of equal parts of potassium pyrazolanthrone, dry potassium carbonate and para-toluenesulfonic acid isopropylester with 15 times its weight of trichlorobenzene, the latter being then removed by steam distillation.

What we claim is:

1. The N-ethyl-N'-isopropyl- 2 : 2'-dipyrazolanthronyl of the formula

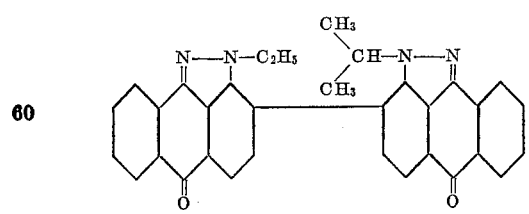

2. The N:N'-diisopropyl-2:2'-dipyrazolanthronyl of the formula

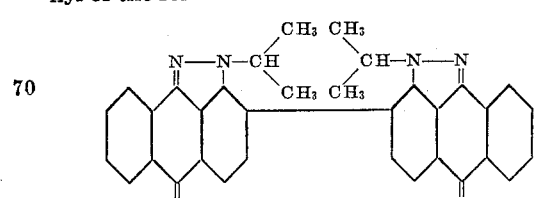

3. The N-methoxyethyl-N'-isopropyl-2:2'-dipyrazolanthronyl of the formula

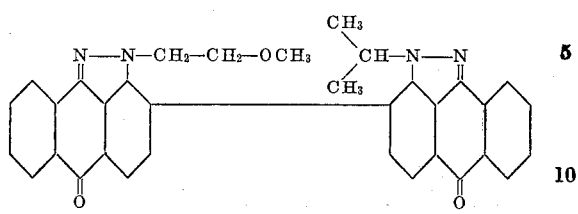

4. N:N' - dialkyl - 2:2' - dipyrazolanthronyls of the general formula

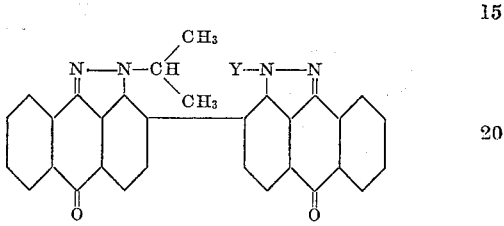

wherein Y stands for a saturated alkyl group containing not more than five aliphatically bound carbon atoms and which is simultaneously a member of the group of substituents consisting of an unsubstituted branched alkyl group, an unsubstituted unbranched alkyl group and an unbranched alkyl group in which one hydrogen atom is replaced by an alkoxy group, the compounds containing no further substituents.

5. The N-R-N'-isopropyl - 2,2' - dipyrazol anthronyl compounds, R being a radical of the group consisting of unsubstituted alkyl radicals containing not more than five aliphatically bound carbon atoms, the compounds having no further substituents.

6. N:N'-dialkyl -2:2'- dipyrazolanthronyl compounds of the general formula

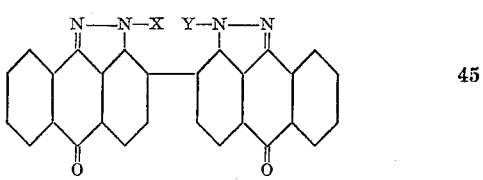

wherein X stands for a saturated, unsubstituted branched alkyl group containing not more than five aliphatically bound carbon atoms, and Y stands for a saturated unsubstituted branched alkyl group containing not more than five aliphatically bound carbon atoms, the compounds having no further substituents.

7. N:N'-dialkyl -2:2'- dipyrazolanthronyl compounds of the general formula

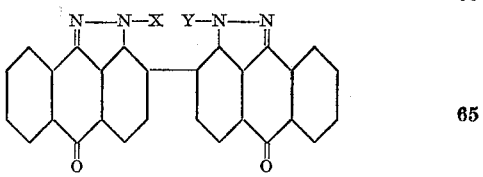

wherein X stands for a saturated, unsubstituted branched alkyl group containing not more than five aliphatically bound carbon atoms, and Y stands for a saturated unsubstituted unbranched alkyl group containing not more than five aliphatically bound carbon atoms, the compounds having no further substituents.

8. N:N'-dialkyl -2:2'- dipyrazolanthronyl compounds of the general formula

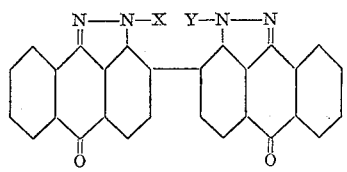

wherein X stands for a saturated unsubstituted branched alkyl group containing not more than five aliphatically bound carbon atoms, and Y stands for a saturated unsubstituted alkyl group containing not more than five aliphatically bound carbon atoms, the compounds having no further substituents.

9. N:N'-dialkyl -2:2'- dipyrazolanthronyl compounds of the general formula

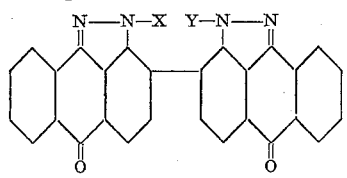

wherein X stands for a saturated unsubstituted branched alkyl group containing not more than five aliphatically bound carbon atoms, and Y stands for a saturated alkyl group containing not more than five carbon atoms and which is simultaneously a member of the group of substituents consisting of an unsubstituted branched alkyl group, an unsubstituted unbranched alkyl group and an unbranched alkyl group in which one hydrogen atom is replaced by an alkoxy group, the compounds containing no further substituents.

10. The compounds of the class consisting of the unsubstituted N-R-N'-isopropyl-2:2'-dipyrazolanthronyl compounds, R being the radical of the group consisting of unsubstituted saturated alkyl radicals containing not more than five aliphatically bound carbon atoms, and their halogen derivatives.

11. The compounds of the class consisting of the unsubstituted N:R-N':R'- 2:2'- dipyrazolanthronyl compounds, R being the radical of the group consisting of unsubstituted saturated alkyl radicals containing not more than five aliphatically bound carbon atoms, R' being a saturated unsubstituted branched alkyl group containing not more than five aliphatically bound carbon atoms, and their halogen derivatives.

JACOB KOCH.
MAX BOMMER.